US011501548B2

(12) United States Patent
Kunnumma et al.

(10) Patent No.: US 11,501,548 B2
(45) Date of Patent: Nov. 15, 2022

(54) METHOD AND SYSTEM FOR DETERMINING ONE OR MORE TARGET OBJECTS IN AN IMAGE

(71) Applicant: EdgeVerve Systems Limited, Bangalore (IN)

(72) Inventors: Niraj Kunnumma, Bangalore (IN); Rajeshwari Ganesan, Palo Alto, CA (US); Anmol Chandrakant Khopade, Bangalore (IN); Akash Gaur, Pune (IN)

(73) Assignee: EDGEVERVE SYSTEMS LIMITED, Bangalore (IN)

( * ) Notice: Subject to any disclaimer, the term of this patent is extended or adjusted under 35 U.S.C. 154(b) by 27 days.

(21) Appl. No.: 16/458,511

(22) Filed: Jul. 1, 2019

(65) Prior Publication Data

US 2020/0320288 A1   Oct. 8, 2020

(51) Int. Cl.
*G06V 30/412* (2022.01)
*G06V 10/26* (2022.01)
*G06V 10/40* (2022.01)
*G06V 30/10* (2022.01)

(52) U.S. Cl.
CPC ............ *G06V 30/412* (2022.01); *G06V 10/26* (2022.01); *G06V 10/40* (2022.01); *G06V 30/10* (2022.01)

(58) Field of Classification Search
CPC ............ G06F 3/04883; G06K 9/00402; G06K 9/00416; G06K 9/00442; G06K 9/00449; G06K 9/00469; G06K 9/2054; G06K 9/222; G06K 9/34; G06K 9/46;

(Continued)

(56) References Cited

U.S. PATENT DOCUMENTS

| 5,841,902 A * | 11/1998 | Tu ............................. G06K 9/46 382/187 |
| 7,711,142 B2 * | 5/2010 | TeSelle ................. G06F 40/103 382/100 |

(Continued)

OTHER PUBLICATIONS

Sharma et al., Integrating Appearance and Motion Cues for Simultaneous Detection and Segmentation of Pedestrians, Oct. 2007, IEEE, pp. 1-8 (Year: 2007).*

*Primary Examiner* — Nancy Bitar
(74) *Attorney, Agent, or Firm* — Troutman Pepper Hamilton Sanders LLP (Rochester)

(57) ABSTRACT

The present disclosure discloses a method and an object determination system for determining one or more target objects in an image. The image is segmented by the object detection system into one or more segments based on visual attributes in a first set. Morphological operations are performed on the one or more segments to obtain one or more morphed segments. One or more candidates of target objects are identified based on visual attributes in a second set corresponding to each one or more morphed segments. The object determination system identifies at least one of true positive and false positive from the one or more candidates which indicates presence or absence of the one or more target objects respectively, based on neighborhood information associated with the one or more candidates. The present disclosure facilitates in determining target objects in document automatically, thereby eliminating manual intervention in identifying target objects in the document.

15 Claims, 8 Drawing Sheets

(58) Field of Classification Search
CPC ........ G06K 2009/3225; G06K 2209/01; G06T 3/4046; G06T 9/002
See application file for complete search history.

(56) References Cited

U.S. PATENT DOCUMENTS

| | | | |
|---|---|---|---|
| 8,830,487 B2* | 9/2014 | Gao | G06K 9/38 |
| | | | 358/1.11 |
| 9,692,942 B2* | 6/2017 | Osadchyy | H04N 1/444 |
| 10,747,387 B2* | 8/2020 | Zhang | G06F 3/0481 |
| 2010/0235727 A1* | 9/2010 | Ashton | G06Q 10/10 |
| | | | 715/253 |
| 2014/0270536 A1* | 9/2014 | Amtrup | G06K 9/00483 |
| | | | 382/195 |
| 2016/0239956 A1* | 8/2016 | Kang | A61B 6/032 |
| 2016/0259971 A1* | 9/2016 | Kim | H04N 1/387 |
| 2017/0124718 A1* | 5/2017 | Long | G06K 9/34 |
| 2019/0034757 A1* | 1/2019 | Shu | G06N 3/0472 |
| 2019/0066293 A1* | 2/2019 | Wang | G06K 9/6267 |
| 2019/0114743 A1* | 4/2019 | Lund | G06N 3/0454 |
| 2020/0396351 A1* | 12/2020 | Saitoh | H04N 1/00806 |

* cited by examiner

SIGNATURE EXAMPLE: *John doe*
JOHN, DOE, INDIVIDUAL AND TRUSTEE

227

229

CONFIRM RECEIPT

BY SIGNING, YOU ARE CONFIRMING THAT YOU HAVE RECEIVED THIS FORM.
NAME_____SIGNATURE

230

CONFIRM RECEIPT

BY SIGNING, YOU ARE CONFIRMING THAT YOU HAVE RECEIVED THIS FORM.

231

| CA LICENSE ID | 6231545 |
|---|---|
| CONTACT | LEONARD JAMES |
| CONTACT NMSL ID | 11145256 |
| CONTACT CA LICENSE ID | CA-DBO999657 |
| EMAIL | LEO21@CLASSY.COM |

Addendum to borrower statement

I have carefully reviewed the closing disclosure and to the best of my knowledge and belief, it is true and accurate statement of all receipts and disbursement to be made on my account or by me in the transactions.

I further certify that I have received a copy of the closing disclosure.

I understand and agree that any shortages in payment made to debtors as "courtesy" or "accomodation" payoff that are not required by the property like credit cards, car loan etc., will be my responsibility.

| Borrower signature | date |
| Borrower signature | date |

Fig.3b

DIFFERENT ORIENTATION

1. OCCUPATION  ☐ PROPRIETORSHIP
   A. IF SALARIED, EMPLOYED WITH:  ☐ GOVERNMENT ☐ PARTNERSHIP

B. IF SELF-EMPLOYED AND,:  ☐ MANUFACTURING ☐ TRADING
      IF IN BUISNESS, NATURE OF BUSINESS:  ☐ DOCTOR

IF PROFESSIONAL, TYPE OF PROFESSION:  ☐ ENGINEER ☐ OTHERS
   C. IF OTHERS :  ☐ HOUSEWIFE
   D. IF ARGI ALLIED/FARMER,  ☐ NIL    ☐ SALARY
      DETAILS OF LANDHOLDING :
   SIGN
   2. EDUCATION:  ☐ UNDER GRADUATE
   3. GROSS ANNUAL INCOME  ☐ PENSION  ☐ FUNDS
   4. SOURCES OF FUND:

BLURRED IMAGE

| name | date |
| --- | --- |
| *John doe* | |

CROWDED REGION

ACKNOWLEDGEMENT TO CUSTOMER

CUSTOMER NAME: | j | o | h | n | e | | d | o | e | | | | |

DATE OF REQUEST RECEIVED: [        ]  SERVICE REQUEST NO [        ]

EMPLOYEE NUMBER OF BRANCH OFFICE: [        ]  SIGNATURE: _____

NAME OF BRANCH OFFICIAL: [                    ]

Fig.5

METHOD AND SYSTEM FOR DETERMINING ONE OR MORE TARGET OBJECTS IN AN IMAGE

This application claims the benefit of Indian Patent Application Serial No. 201941013241 filed Apr. 2, 2019, which is hereby incorporated by reference in its entirety.

FIELD

The present subject matter is related in general to computer vision and image processing, more particularly, but not exclusively to a method and system for determining one or more target objects in an image.

BACKGROUND

In recent time electronic signatures have created a new level of convenience for organization, especially for the ones dealing with enormous document processing. Today, there exist numerous applications and services for electronic signing, such as, DocuSign, Adobe Sign and the like, which allow to send requests and receive signatures for business purposes. Different signature programs may collect signatures through various ways such as, touchpad interface, typing a name, using a designated pin code or even just clicking a checkbox.

Identification of a field in a document such as, signature, logos, seal and the like, requires constant manual intervention. Typically for identification of the signature field, conventional system involves reading several pages of documents, identifying who must sign at each place, and send it to parties for signature. In case of any mistakes of either missing out information, or a person signing at a wrong place may result in huge rework and, in many cases, more serious consequences. Today, with digital signature becoming de-facto for signature, making a document digital signature ready is more time-consuming. The document must be prepared to determine a location for each signer punched with a digital marker, an email id for each user and the like.

Additionally, the conventional system relies on techniques such as, Optical Character recognition (OCR) and other related text matching approaches. Generally, such approaches are not language agnostics and cannot be used for documents present in different languages. The OCR technique performs processing based on image quality, text orientation, text identification, extraction using rules and regular expression by viewing entire document for identification of signature field. Hence, the OCR technique requires huge noise reduction across the document. Also, the OCR technique and other related text matching approaches may not work on objects which do not have textual data, such as, logos, seals and other patterns. Further, the conventional system includes other rule-based systems for processing documents which may work only for specified templates and fails for new templates.

Thus, convention document processing approach processes the document manually which involves human efforts in identifying positions of physical signatures signed using pen, or to punch in information for triggering a downstream digital signature process. Thus, there is a need for automatic identification of signature field, seals and the like.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for determining one or more target objects in an image. The method includes segmenting the image into one or more segments based on one or more visual attributes in a first set and performing one or more morphological operations on the one or more segments to obtain one or more morphed segments. Further, one or more candidates of the one or more target objects are identified based on one or more visual attributes in a second set corresponding to each of the one or more morphed segments. Thereafter, identifying at least one of, true positive and false positive from the one or more candidates indicative of presence or absence of the one or more target objects respectively, based on neighborhood information associated with the one or more candidates.

In an embodiment, the present disclosure may relate to an object determination system for determining one or more target objects in an image. The object determination system may include a processor and a memory communicatively coupled to the processor, wherein the memory stores processor executable instructions, which, on execution, may cause the object determination system to segment the image into one or more segments based on one or more visual attributes in a first set and perform one or more morphological operations on the one or more segments to obtain one or more morphed segments. Further, the object determination system identifies one or more candidates of one or more target objects based on one or more visual attributes in a second set corresponding to each of the one or more morphed segments. Thereafter, the object determination system identifies at least one of, true positive and false positive from the one or more candidates indicative of presence or absence of the one or more target objects respectively based on neighborhood information associated with the one or more candidates.

In an embodiment, the present disclosure relates to a non-transitory computer readable medium including instructions stored thereon that when processed by at least one processor may cause an object determination system to segment the image into one or more segments based on one or more visual attributes in a first set and perform one or more morphological operations on the one or more segments to obtain one or more morphed segments. Further, one or more candidates of one or more target objects are identified based on one or more visual attributes in a second set corresponding to each of the one or more morphed segments. Thereafter, the object determination system identifies at least one of, true positive and false positive from the one or more candidates indicative of presence or absence of the one or more target objects respectively, based on neighborhood information associated with the one or more candidates.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or method in accordance with embodiments of the present subject matter are now described, by way of example only, and with reference to the accompanying figures, in which:

FIG. 2b shows an exemplary representation for determining one or more target objects in accordance with some embodiments of the present disclosure;

FIG. 3a and FIG. 3b show exemplary representations of determining target objects from a document in accordance with some embodiments of the present disclosure;

FIG. 5 show an exemplary representation of a document with blurred regions, crowded regions and representation in different orientations for determining target objects in accordance with some embodiments of the present disclosure.

Figure 1:
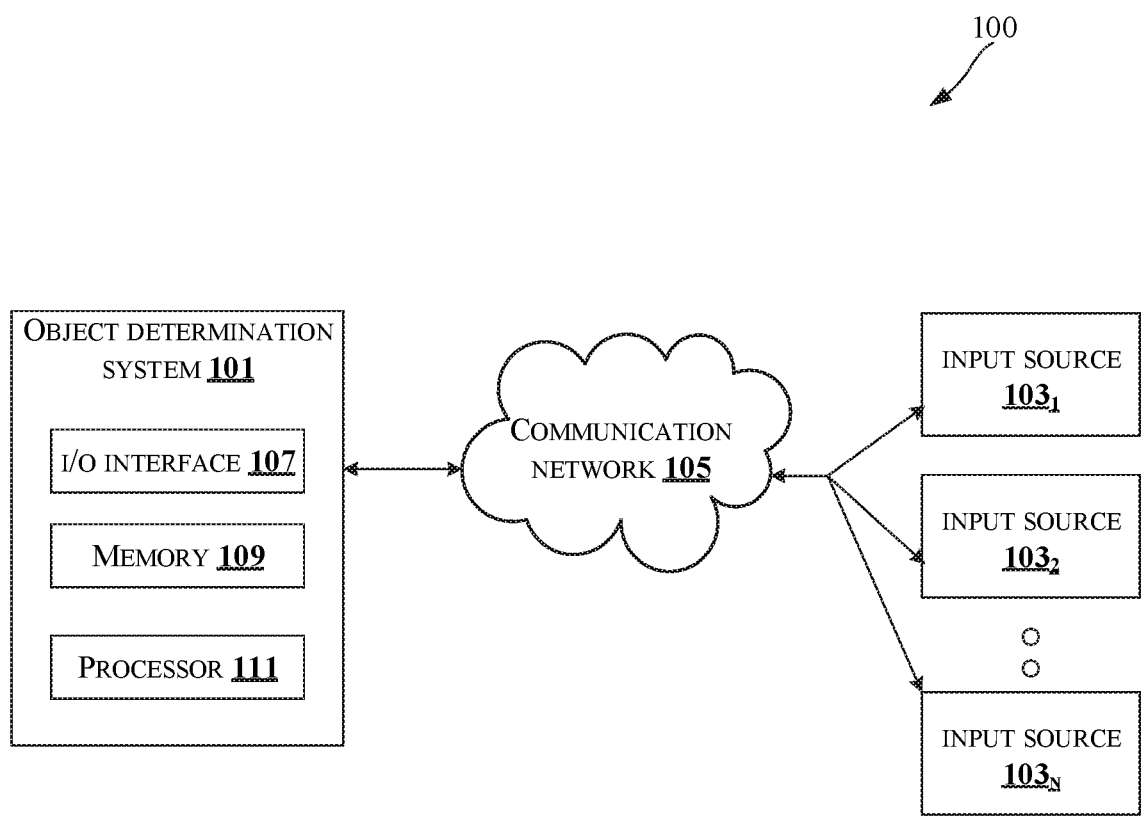
FIG. 1 illustrates an exemplary environment for determining one or more target objects in an image in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Definitions

Object determination system may be any computing device capable of processing a document and determining the one or more target objects in the document.

One or more target objects may refer to a field in the document which is identified by an object determination system. In one embodiment, the target object may refer to a vacant field for signature, initials, notary, seal or a field for initials, signature, notary and seal in the document.

Input sources may be any computing device for providing the document in non-image format or the image of the document to the object determination system for identification of the one or more target objects in the document.

Visual attributes in a first set and visual attributes in a second set may refer to attributes in the document as understood by human eyes and brain. For example, a person visually understands presence of title, paragraphs and the like in the document, even if the document is in any language.

Embodiments of the present disclosure relates to a method and an object determination system for determining one or more target objects in an image. In an embodiment, the image may be a document or may be obtained from the document. In an embodiment, the one or more target objects may refer to a field in the document which is identified by the object determination system. In one embodiment, the target object may be a vacant field for signature, initials, notary, seal or a field for initials, signature, notary and seal in the document. Thus, in an embodiment, given an image of the document, the object determination system divides/segments the image into one or more segments based on one or more visual attributes in a first set. In another embodiment, the object determination system may receive the document directly in a non-image format. In such case, the object determination system may convert the document into an image format before segmentation. One or more morphological operations are performed on the one or more segments to obtain one or more morphed segments. The object determination system may identify one or more candidates for one or more target objects from the one or more morphed segments based on one or more visual attributes in a second set corresponding to each of the one or more morphed segments.

Thereafter, based on neighborhood information associated with the one or more candidates, the object determination system identifies at least one of true positive and false positive from the one or more candidates which indicates one of presence and absence of the one or more target objects respectively. In an embodiment, the neighbourhood information may be identified parallelly along with the identification of the one or more candidates based on the one or more visual attributes in a second set corresponding to each of the one or more morphed segments. The present disclosure facilitates in determining one or more target objects in the document accurately and automatically, thereby eliminating manual intervention in identifying positions of physical signatures, seal, notary, initial and the like in the document.

FIG. 1 illustrates an exemplary environment for determining one or more target objects in an image in accordance with some embodiments of the present disclosure.

As shown in FIG. 1, an environment 100 includes an object determination system 101 connected through a communication network 105 to an input source $103_1$, an input source $103_2$ and an input source $103_N$ (collectively referred as input sources 103). In an embodiment, the input sources 103 may be present within the object determination system 101. The object determination system 101 may receive a document either in an image format or non-image format from the input sources 103 for identification of one or more target objects in the document. In an embodiment, the image format is a standard file format for storing the document in digital format, where content of the documents becomes non-editable. Example for image format may be document in Joint Photographic Experts Group (JPEG) format, Graphics Interchange Format (GIF), Tagged Image File Format (TIFF) format and the like. Whereas, the non-image format may refer to a file format, where contents of the document are editable. Examples of non-image format may include Hyper Text Markup Language (HTML) format, word processing document, and the like. In an embodiment, the input sources 103 may be any computing devices, for example a laptop, a desktop computer, a scanner, a Personal Digital Assistant (PDA), a notebook, a smartphone, a tablet, and any other computing devices. A person skilled in the art would understand that the scope of the present disclosure may encompass any other input sources 103, for providing the documents, not mentioned herein explicitly. Further, the communication network 105 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi and the like.

The object determination system 101 may determine one or more target objects in an image associated with the document received from the input sources 103. In an embodiment, the document refers to a record or captured information which is written, presented, drawn and the like and may be stored physically or in electronic form. As an example, the document may include invoices, wills, deeds, agreements between parties, oral recordings, executive orders, product specification, employee details and the like depending upon type of organization, which is involved in one or more of dealing, using, storing, creating the document and the like. In one embodiment, the object determination system 101 may include, but is not limited to, a laptop, a desktop computer, a Personal Digital Assistant (PDA), a notebook, a smartphone, a tablet, a server, and any other computing devices. A person skilled in the art would understand that, any other devices, not mentioned explicitly, may also be used as the object determination system 101 in the present disclosure. In an embodiment, the object determination system 101 may be any computing device capable of processing a document and determining the one or more target objects in the document.

Further, the object determination system 101 may include an I/O interface 107, a memory 109 and a processor 111. The I/O interface 107 may be configured to receive the image of the document or the document in non-image format from the input sources 103. The image of the document or the document received from the I/O interface 107 may be stored in the memory 109. The memory 109 may be communicatively coupled to the processor 111 of the object determination system 101. The memory 109 may also store processor instructions which may cause the processor 111 to execute the instructions for determining the one or more target objects in the document. In an embodiment, the one or more target objects comprise at least one of a vacant field for initials, signature, notary, and seal or a field for one of initials, signature, notary and seal. A person skilled in the art would understand that the scope of the present disclosure may encompass any other target objects in the document, not mentioned herein explicitly.

In an implementation, the object determination system 101 may be configured as a standalone device or may be integrated with computing systems. In an embodiment, the object determination system 101 may include a machine learning model. Initially, the machine learning model is trained using a plurality of documents of different types. Alternatively, the object determination system 101 may be trained using a rule-based model. Further, in an embodiment the object determination system 101 may implement the machine learning model that learns by combining pre-training technique and based on previous processing performed by the object determination system 101. A person skilled in the art would understand that any other machine learning or artificial intelligence method or technique, not mentioned explicitly, may also be used by the object determination system 101 in the present disclosure.

The object determination system 101 may receive the image of the document for determining the one or more target objects from an input source of the input sources 103 in real-time, in case the input source is present external to the object determination system 101. Alternatively, the image of the document may be retrieved locally in case the input source of the input sources 103 is present within the object determination system 101. On receiving the image, the object determination system 101 may divide the image into one or more segments based on one or more visual attributes in a first set. In an embodiment, the object determination system 101 may receive the document directly which is not in the image format. In such cases, the object determination system 101 may convert the document into the image format before performing segmentation. In an embodiment, the one or more visual attributes in a first set may enable identification of paragraphs, logos, tables, footers and headers in the received image. In an embodiment, the one or more visual attributes in a first set may be identified using the machine learning model present in the object determination system 101. The machine learning model may learn the one or more visual attributes in a first set over a period of time based on previous processing performed by the object determination system 101. In an embodiment, the machine learning model may be pre-trained to learn the one or more visual attributes in a first set based on training data and by using expertise from a Subject Matter Expert (SME).

Thus, the one or more segments segmented visually may include at least one of, the paragraphs, the logos, the tables, the footers, the header and the like. Further, on determining the one or more segments, the object determination system 101 may perform one or more morphological operations on the one or more segments to obtain one or more morphed segments. In an embodiment, the one or more morphological operations comprise erosion, dilation and redaction. A person skilled in the art would understand that, any other morphological operations, not mentioned explicitly, may also be used in the present disclosure. In an embodiment, morphological operation is a set of image processing operations that process images based on patterns, where the patterns are identified based on pixel values in the image. In the morphological operations, each pixel in the image is adjusted based on value of other pixels placed adjacently. In an embodiment, the erosion and dilation operations apply a structuring element to the one or more segment of the input image and creates an output image with one or more segments of the same size.

While performing the erosion and the dilation operations, the value of each pixel in the output image is based on a comparison of the corresponding pixel in the input image with one or more neighboring pixel. In an embodiment, erosion and dilation operators sensitive to specific patterns in the one or more segments may be constructed by choosing a size and a shape of the structuring element. The dilation, using the above-mentioned technique, adds pixels to boundaries of objects or patterns in the image. On performing the one or more operations in a sequence, patterns like text such as, words, sentences, paragraphs, and the like in the one or more segments may be redacted. In an embodiment, the machine learning model present in the object determination system 101 may be trained using eroded, dilated and redacted training images in order to make the machine learning model language agnostic.

On performing the morphological operations, the object determination system 101 may obtain the one or more morphed segments. Further, the object determination system 101 may identify one or more candidates for the target objects based on one or more visual attributes in a second set corresponding to each of the one or more morphed segments. In an embodiment, the one or more visual attributes in a second set includes details associated with each type of target objects. For example, for a signature field, the visual attributes in a second set associated with the signature may include details on how signatures are represented in documents, format, and the like. The one or more visual attributes in a second set may be predefined and stored in the object determination system 101. In an embodiment, the machine learning model present in the object determination system 101 may be trained previously using training images to identify the one or more visual attributes in a second set. Additionally, the machine learning model may learn the one or more visual attributes in a second set over a period of time based on previous processing performed by the object determination system 101. In an embodiment, the machine learning model may be pre-trained to learn the one or more visual attributes in a second set based on the training data and by using the expertise from the SME.

Subsequently, the object determination system 101 may identify neighbourhood information for the one or more candidates by using the one or more visual attributes in a second set. In an embodiment, the neighbourhood information comprises at least one of text, images, margins, tables and numbers placed adjacent to the one or more candidates. A person skilled in the art would understand that the any other neighbourhood information, not mentioned herein explicitly, may also be used in the present disclosure. In an embodiment, during the segmentation of the image, location information for each segment in the document is identified and stored in the memory 109. The location information comprises a rectangular area represented by coordinates of top-left and bottom-right pixels of each segment. Further, the rectangular area may be represented by other possible dimensions such as, coordinates of centre pixel, height and width and the like. A person skilled in the art would understand that, the location information may comprise any other geometrical shape not mentioned explicitly in the present disclosure. Further, any other method of using the coordinates to represent the location information, not mentioned explicitly, may also be used in the present disclosure. In an embodiment, the object determination system 101 may refer to morphed content surrounding the one or more candidates to identify corresponding neighbourhood information. Once the surrounding morphed content is identified, pixel information associated with the surrounding morphed content is mapped with the pixel information in the document and the location information, thus corresponding content residing in the rectangular area may be retrieved in order to identify neighbourhood information.

In an embodiment, the object determination system 101 identifies the neighborhood information sequentially after identifying the one or more candidates by using the one or more visual attributes in a second set. In an embodiment, sequential implementation may include providing the one or more morphed segments to a machine learning classifier for classifying the one or more morphed segments as the one or more candidates for the target objects. In an embodiment, the machine learning classifier may be any learning or rule-based models or systems which are well known in the art. For instance, the machine learning classifier may involve a neural network such as, convolutional neural network which may be used for classifying image data. Further, the machine learning classifier in the present disclosure may be implemented using other techniques such as, SVM's, logistic regressors, decision trees, random forests, rule-based or any other technique well known in the art. A person skilled in the art would understand that above mentioned models are examples, and the present disclosure may include any other implementation of the machine learning classifier, not mentioned explicitly in the present disclosure. Further, on receiving the one or more morphed segments, the machine learning classifier may output a probability score for the one or more morphed segments to be the one or more candidates of the target objects. In an embodiment, a classifier threshold value may be defined in order to identify the one or more candidates for the target objects.

The classifier threshold value may be any predefined value for example "0.5". In an embodiment, the machine learning classifier may be enabled to learn the classifier threshold value based on the training images. Further, the machine learning classifier may provide an ability to fine-tune the classifier threshold value. The object determination system 101 may identify the one or more morphed segments as the one or more candidates for the target objects, if the output probability score is greater than the classifier threshold value. Further, in an embodiment, the object determination system 101 may provide the neighbourhood information of the one or more candidates to a second machine learning classifier. The second machine learning classifier may identify at least one of true positive and false positive from the one or more candidates which indicates either one of presence and absence of the one or more target objects respectively based on the neighborhood information.

In another embodiment, the object determination system 101 may identify the neighborhood information parallelly along with the identification of the one or more candidates. In an embodiment, for a parallel implementation, the object determination system 101 may include stacking two classifiers parallelly and using a third classifier to weigh outputs of the two classifiers. In an embodiment, the two classifiers may be convolutional neural network. Particularly, a first classifier out of the two classifiers may receive the one or more morphed segment and outputs a first probability score for the one or more morphed segments to be the one or more candidates of target objects based on the one or more visual attributes in a second set. Further, a second classifier of the two classifiers may receive the neighborhood information associated with the one or more candidates and outputs a second probability score for the one or more morphed segments to be the one or more candidates of target objects. Thereafter, the third classifier which may be for example, a flat fully connected neural network, receives the first probability score and the second probability score from each of the two classifiers and outputs a final probability score for the one or more morphed segments to be the one or more target objects.

Thereafter, the object determination system 101 identifies at least one of the true positive and false positive from the one or more candidates which indicates either one of presence and absence of the one or more target objects respectively based on the neighborhood information. In an embodiment, the true positive and the false positive may be identified using the machine learning model. In an embodiment, the machine learning model may be trained previously using training images to identify the true positive and the false positive. In an embodiment, the true positive may refer to the one or more candidates identified to be as the one or more target object. Whereas, the false positive may refer to the one or more candidates which may not contain the one or more target objects. In an embodiment, the false positives may be filtered based on the neighborhood information using processes such as, text comparison technique, pattern match, intelligent intent identification and the like.

Further, the object determination system 101 determines a location in the document corresponding to a pixel location of the one or more target objects in the image to create a placeholder for at least one of initials, signature, notary, logo and seal. In order to determine the location, the object determination system 101 maps the pixel location of the one or more target objects with the stored location information and rescales location co-ordinates using Depth Per inch (DPI) of the image and the document. In an embodiment, the object determination system 101 may determine the one or more target objects in the image which comprises at least one of blurred regions and crowded regions and represented in different orientations. In an embodiment, the blurred regions, crowded regions and objects present in different orientations may be determined using the machine learning model. The machine learning model may be trained previously using the training images to identify the blurred regions, crowded regions and objects present in different orientations. In an embodiment, since the object determination system 101 in the present disclosure utilizes morphological operations to identify morphed segments from the image, presence of content structure of the image such as, blurred regions, crowded regions and different orientations becomes irrelevant.

Figure 2A:
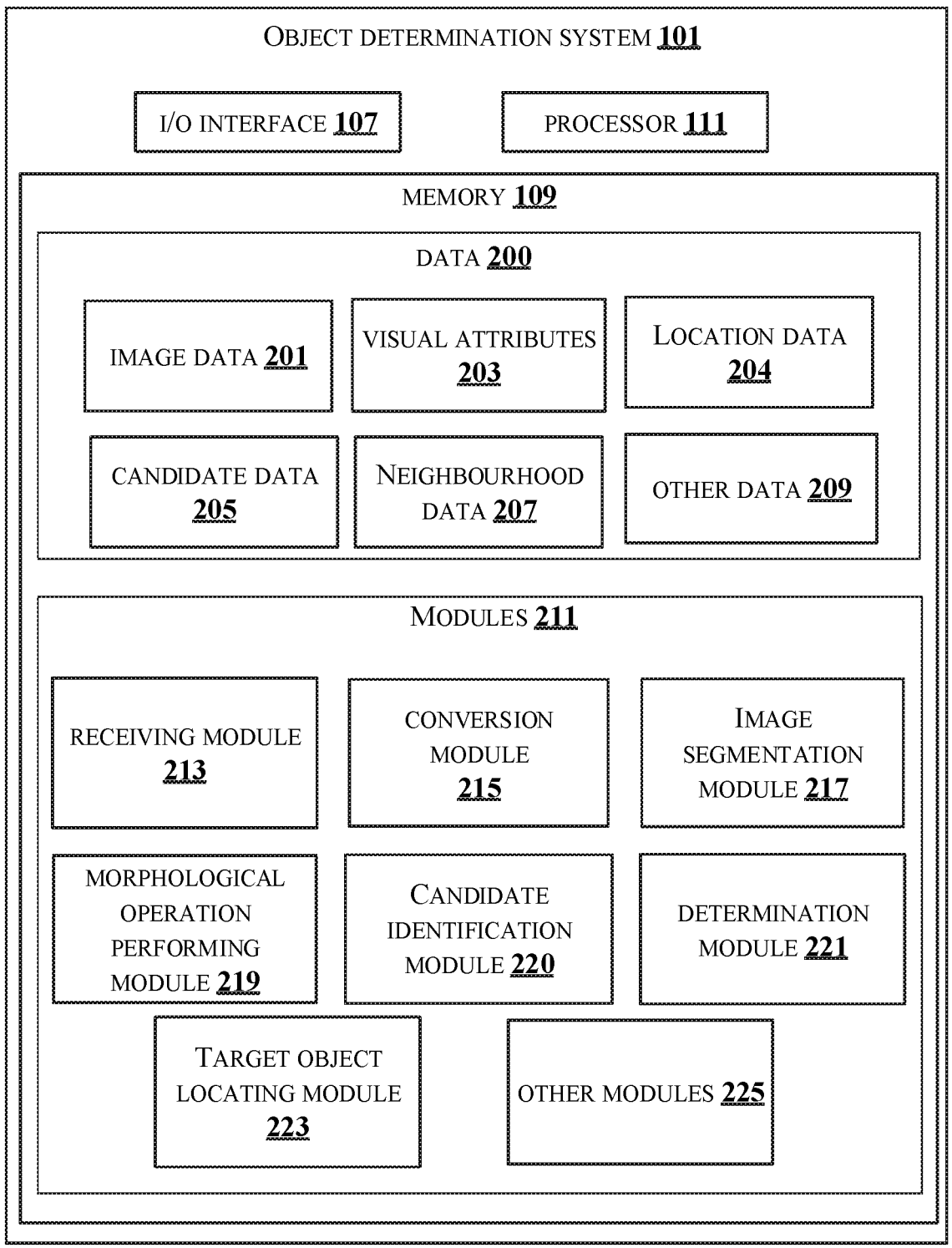
FIG. 2a shows a detailed block diagram of an object determination system in accordance with some embodiments of the present disclosure.

FIG. 2a shows a detailed block diagram of an object determination system in accordance with some embodiments of the present disclosure.

The object determination system 101 may include data 200 and one or more modules 211 which are described herein in detail. In an embodiment, data 200 may be stored within the memory 109. The data 200 may include, for example, image data 201, visual attributes 203, location data 204, candidate data 205, neighborhood data 207 and other data 209.

The image data 201 may include the image of the document received from the input sources 103. In an embodiment, the document may be in any language. In an embodiment, the image data 201 may also include the document, if the object determination system 101 receives the document in the non-image format. Further, the image data 201 may include the image of the document after conversion into the image format.

The visual attributes 203 may include the one or more visual attributes in a second set. In an embodiment, the one or more visual attributes in a second set includes details associated with each type of the target objects. For example, for the signature field, the visual attributes in a second set associated with the signature may include details on how signatures are represented in documents, format, and the like. The one or more visual attributes in a second set may be predefined and stored in the visual attributes 203.

The location data 204 may include the location information of each content in the document. The location information may include the content along with corresponding coordinates details in the rectangular area. Further, the location data 204 may include pixel coordinates of each of the one or more segments of the image.

The candidate data 205 may include the one or more morphed segments which may be possible to be one or more target objects.

The neighborhood data 207 may include information present adjacent to the one or more segments in conjunction with the location information. In an embodiment, the information comprises text, images, margins, tables and numbers. A person skilled in the art would understand that any other neighborhood information, not mentioned herein explicitly, may also be used in the present disclosure.

The other data 209 may store data, including temporary data and temporary files, generated by modules 211 for performing the various functions of the object determination system 101.

In an embodiment, the data 200 in the memory 109 are processed by the one or more modules 211 present within the memory 109 of the object determination system 101. In an embodiment, the one or more modules 211 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 211 may be communicatively coupled to the processor 111 for performing one or more functions of the object determination system 101. The said modules 211 when configured with the functionality defined in the present disclosure will result in a novel hardware.

In one implementation, the one or more modules 211 may include, but are not limited to a receiving module 213, a conversion module 215, an image segmentation module 217, a morphological operation performing module 219, a candidate identification module 220, a determination module 221 and a target object locating module 223. The one or more modules 211 may also include other modules 225 to perform various miscellaneous functionalities of the object determination system 101. In an embodiment, the other modules 225 may include neighborhood information determination module which determines information placed adjacent to the one or more candidates. For example, the neighborhood information may include, at least one of text, images, margins, tables and numbers.

The receiving module 213 may receive either the image of the document or the document which is not in the image format from the input sources 103. In case the receiving module 213 receives the image, the image is transmitted to the image segmentation module 217 directly for processing. Otherwise, the document received from the input sources 103 is transmitted to the conversion module 215 before transmitting to the image segmentation module 217 for converting to the image format.

The conversion module 215 may convert the document received from the input sources 103 in the non-image format to the image format. In an embodiment, the conversion module 215 may be any known convertor. In an embodiment, the image format is the standard file format for storing the document in digital format, where content of the documents becomes non-editable. Example for image format may be document in Joint Photographic Experts Group (JPEG) format, Graphics Interchange Format (GIF), Tagged Image File Format (TIFF) format and the like. Whereas, the non-image format may refer to a file format in non-digital format. Examples of non-image format may include, Portable Document Format (PDF), Hyper Text Markup Language (HTML) format and the like. For example, if the document is in PDF format, the conversion module 215 may convert the document into PJEG format. In an embodiment, any conversion technique may be used for converting the non-image format to image format.

The image segmentation module 217 may segment the image received from either the receiving module 213 or the conversion module 215 in to one or more segments. The image segmentation module 217 may segment based on the one or more visual attributes in a first set. In an embodiment, the one or more visual attributes in a first set enable to identify at least one of paragraphs, logos, tables, footers and headers in the received image. In an embodiment, the visual attributes in a first set may be prestored or predefined using a set of rules. In an embodiment, the one or more visual attributes in a first set may analyze how the image visually appears. For instance, the visual attributes in a first set may contain a set of rules to identify paragraphs in the image based on the format in the image. In an embodiment, the machine learning model may be trained with the training images to segment the images based on the one or more visual attributes in a first set. Further, the machine learning model may learn to segment based on the segmentation performed over the period of time. For example, consider an image of an agreement document which comprises multiple paragraphs, header, footer and a signature field. The image segmentation module 217 may segment the image into four segments with header as first segment, paragraphs as second segment, the footer as third segment and the field for signature as fourth segment.

The morphological operation performing module 219 may perform the one or more morphological operations on the one or more segments of the image. The one or more morphological operations are performed to obtain the one or more morphed segments. In an embodiment, the one or more morphological operations comprise erosion, dilation and redaction. A person skilled in the art would understand the any other morphological operations, not mentioned herein explicitly, may also be used in the present disclosure.

The candidate identification module 220 may identify the one or more candidates of the one or more target objects. The candidate identification module 220 may use the one or more visual attributes in a second set corresponding to each of the one or more morphed segments to identify the one or more candidates of the one or more target objects. In an embodiment, the one or more visual attributes in a second set corresponding to each type of morphed segments may be predefined and stored in the memory 109. The one or more visual attributes in a second set define how the target objects may appear. For instance, for a signature field, the visual attributes in a second set may indicate format of the signatures, for example, for a signature, a vacant space in terms of a line may be present above or below.

The determination module 221 determines the one or more target objects by determining at least one of the true positive and the false positive from the one or more candidates. In an embodiment, the true positive indicates the presence of the one or more target objects and the false positives indicates absence of the one or more target objects. FIG. 2b illustrates exemplary embodiment for determination of one or more target objects. The determination module 221 may determine the one or more target objects based on the neighborhood information associated with the one or more candidates. In an embodiment, the neighborhood information may be identified parallelly or sequentially along with the identification of the one or more candidates using the visual attributes in a second set. In an embodiment, the neighborhood information may be identified using the machine learning model present in the object determination system 101. The machine learning model may learn type of neighborhood information over a period of time based on previous processing performed by the object determination system 101. In an embodiment, the machine learning model may be pre-trained to learn the neighborhood information based on the training data and by using the expertise from the SME.

FIG. 2b shows three segments namely segment 227, segment 229, segment 230 and segment 231. For example, the determination module 221 determines the segment 227 as the false positive based on the one or more visual attributes in a second set of the segment 227. For instance, based on the one or more visual attributes in a second set, such as signature format, the determination module 221 may determine the segment 227 to be false positive since the segment 227 represents an exemplary instruction to a user and is not a signature location. Further, the determination module 221 refers to the neighborhood information in order to determine the one or more target object. For example, the segment 229 is displayed before performing morphological operation and the segment 230 is a morphed segment of the segment 229. The determination module 221 may refer to the neighborhood information, which is placed above the signature field to ascertain the one or more target objects in the segment 230. Since the segment 230 is morphed, the determination module 221 may refer to the location data 204 to retrieve the pixel information associated with the morphed content. The pixel information of the morphed content around the segment 230 is mapped with the pixel information in the image and the location information in order to identify the neighborhood information. As seen in the segment 229, the neighborhood information comprises the text indicating "by signing you are confirming that you have received this form", which indicates the presence of signature target field in the segment 230. Further, referring to the segment 231, the determination module 221 may identify the segment 231 to be false positive. The segment 231 is identified as false positive based on the neighborhood information which indicates the candidate to possibly be a row in the table as shown in FIG. 2b.

Once the one or more target objects are determined in the image, the target object locating module 223 may determine the location in the document which corresponds to the pixel location of the one or more target objects in the image. The location is determined to create a placeholder for the identified one or more target objects. For example, the placeholder for initial, signature, seal and the like. Thus, based on the pixel location, the target object locating module 223 may locate the one or more target objects in the document. In order to determine the location, the target object locating module 223 may map the pixel coordinates of the one or more target objects with the stored location information and rescales location co-ordinates using Depth Per inch (DPI) of the image and the document.

Figure 3A:
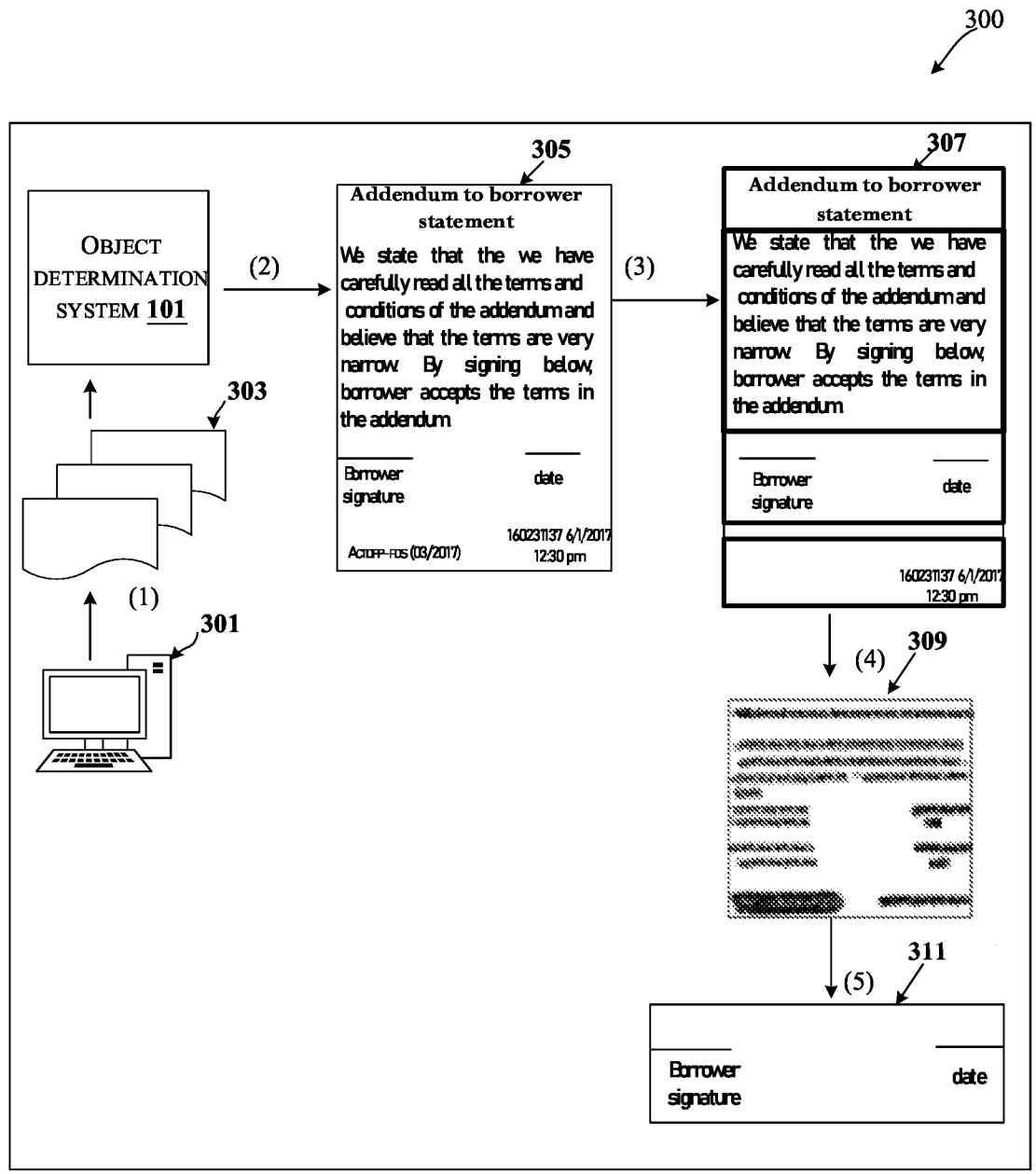

FIG. 3 shows an exemplary representation of determining target objects from a document in accordance with some embodiments of the present disclosure.

Referring now to FIG. 3, an exemplary representation 300 for determining one or more target object, namely, a signature field in the document is illustrated. In the FIG. 3, the exemplary representation 300 includes the object determination system 101 connected to an input source, such as a computer system 301 over a communication network (not shown explicitly in the FIG. 3). A person skilled in the art would understand that FIG. 3 is an exemplary embodiment and the present disclosure may include a plurality of input sources 103. Consider, at step (1), the object determination system 101 receives a document 303 from the computer system 301 for determining one or more target objects in the document 303. The document 303 received from the computer system 301 is not in the image format. For example, the document 303 is in PDF format. In such case, the object determination system 101 at step (2) converts the document 303 into the image format. In an embodiment, the image received from the input sources 103 may contains one or more pages.

In the present case, the document 303 for instance contains fifty sheets. In such case, the object determination system 101 converts each sheet of the document 303 into the image format. An image format for a first sheet 305 is shown in FIG. 3. After conversion, the object determination system 101 segments the received image into one or more segments based on the one or more visual attributes in a first set. In the present case, for instance, the first sheet 305 is segmented into four segments as shown at step (3). The first sheet 305 is segmented into the header segment, the paragraph segment, footer segment and a signature field segment. The first sheet 305 is represented as 307 in FIG. 3. In an embodiment, in case if the object determination system 101 receives the image format of the document 303, the conversion of the document 303 is not required and the received image of the document 303 is segmented directly.

Further, at step (4), the object determination system 101 performs one or more morphological operations on the four segments identified from the first sheet 305. For instance, the one or more morphological operations comprises erosion, dilation and redaction. On performing the one or more morphological operations, the object determination system 101 obtains one or more morphed segments of the one or more segments. The object determination system 101 identifies four morphed segments, represented by 30 on performing the morphological operations. Further, the object determination system 101 identifies one or more candidates of the one or more target objects based on the one or more visual attributes in a second set corresponding to each of the four morphed segments. Thereafter, the object determination system 101 identifies the one or more target objects by identifying at least one of, true positive and false positive from the one or more candidates which indicate the presence or absence of the one or more target objects respectively based on neighborhood information associated with the one or more candidates. In the present case, at step (5), the object determination system 101 identifies the neighborhood information associated with the one or more candidates and determines a signature field as the target object in the first sheet 305 as represented by 311. In an embodiment, the object determination system 101 locates the signature field in the first sheet 305 based on the pixel location of the signature field in the corresponding segment. The signature field as located in shown in FIG. 3b. FIG. 3b shows an image of a document 313 with the target object as the signature field (as shown in highlighted box).

Figure 4:
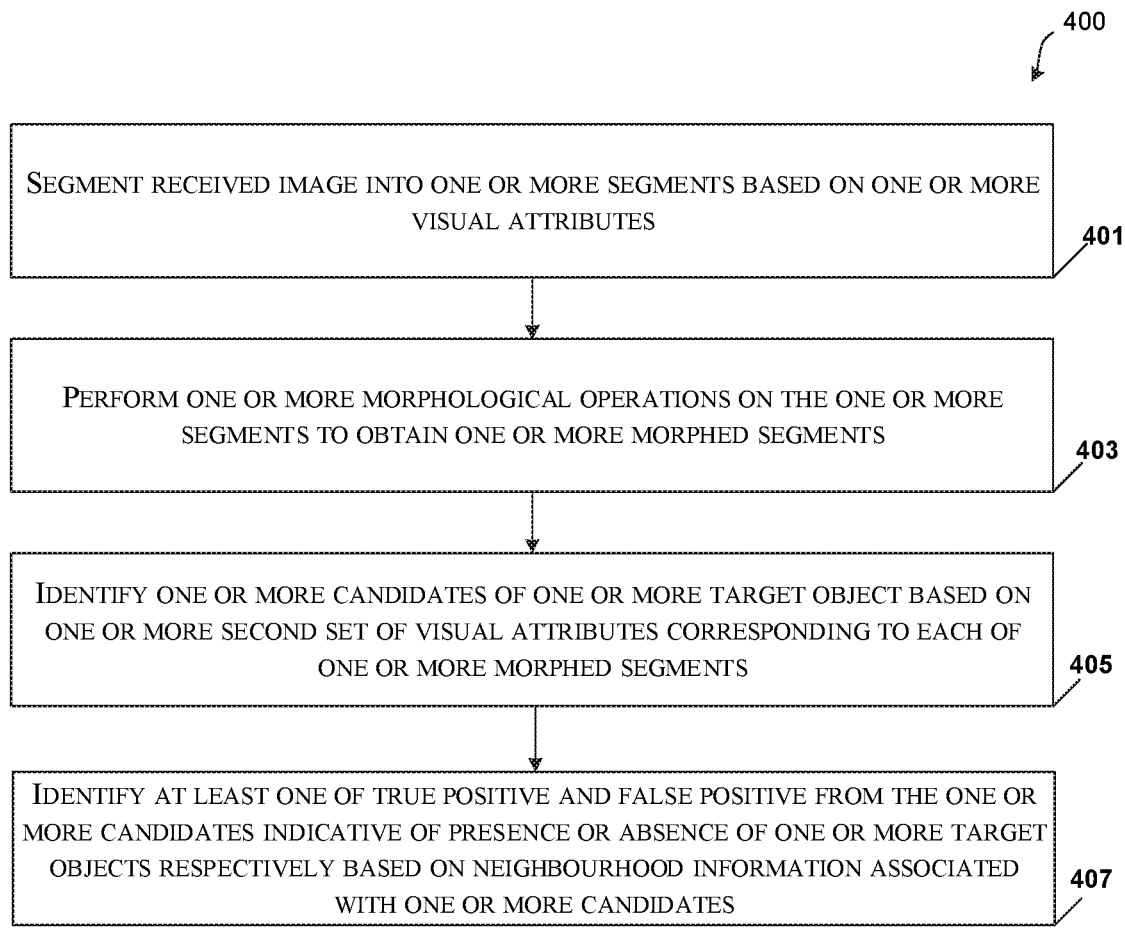
FIG. 4 illustrates a flowchart showing a method for determining one or more target objects in an image in accordance with some embodiments of present disclosure.

FIG. 4 illustrates a flowchart showing a method for determining one or more target objects in an image in accordance with some embodiments of present disclosure.

As illustrated in FIG. 4, the method 400 includes one or more blocks for determining one or more target objects. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the image of the document received from the input sources 103 is segmented by the image segmentation module 217 into one or more segments based on the one or more visual attributes in a first set. In an embodiment, the visual attributes in a first set enable identification of the paragraphs, the logos, the tables, the footers and the headers in the image. In an embodiment, if the object determination system 101 receives the document in the non-image format, instead of the image of the document, the conversion module 215 converts the received document into the image format before the segmentation.

At block 403, the one or more morphological operations are performed by the morphological operation performing module 219 on the one or more segments to obtain the one or more morphed segments.

At block 405, the one or more candidates of the one or more target objects are identified from the one or more morphed segments by the candidate identification module 220 based on the one or more visual attributes in a second set corresponding to each of the one or more morphed segments. In an embodiment, the neighborhood information may be identified sequentially after identifying the one or more candidates by using the one or more visual attributes in a second set. In an embodiment, sequential implementation may include providing the one or more morphed segments to the machine learning classifier for classifying the one or more morphed segments as the one or more candidates for the target objects. Further, on receiving the one or more morphed segments, the machine learning classifier may output the probability score for the one or more morphed segments to be the one or more candidates of the target objects. In an embodiment, the classifier threshold value may be set in order to identify the one or more candidates for the target objects.

The candidate identification module 220 may identify the one or more morphed segments as the one or more candidates for the target objects, if the output probability score is greater than the predefined classifier threshold value. Further, in an embodiment, the neighborhood information of the one or more candidates may be provided to the second machine learning classifier. The second machine learning classifier may identify at least one of true positive and false positive from the one or more candidates which indicates either one of presence and absence of the one or more target objects respectively based on the neighborhood information. In an embodiment, for the parallel implementation, the candidate identification module 220 may include stacking the two classifiers parallelly and using the third classifier to weigh outputs of the two classifiers. In an embodiment, the two classifiers may be of convolutional neural network. The first classifier out of the two classifiers may receive the one or more morphed segment and output the first probability score for the one or more morphed segments to be the one or more candidates of target objects based on the one or more visual attributes in a second set. Further, the second classifier of the two classifiers may receive the neighborhood information associated with the one or more candidates and outputs the second probability score for the one or more morphed segments to be the one or more candidates of target objects. Thereafter, the third classifier may receive the first probability score and the second probability score from each of the two classifiers and outputs the final probability score for the one or more morphed segments to be the one or more candidates of target objects.

At block 407, the determination module 221 identifies at least one of the true positive and the false positive from the one or more candidates which indicates the presence or the absence of the one or more target objects respectively. The determination module 221 may determine the one or more target objects based on the neighborhood information associated with the one or more candidates.

Figure 6:
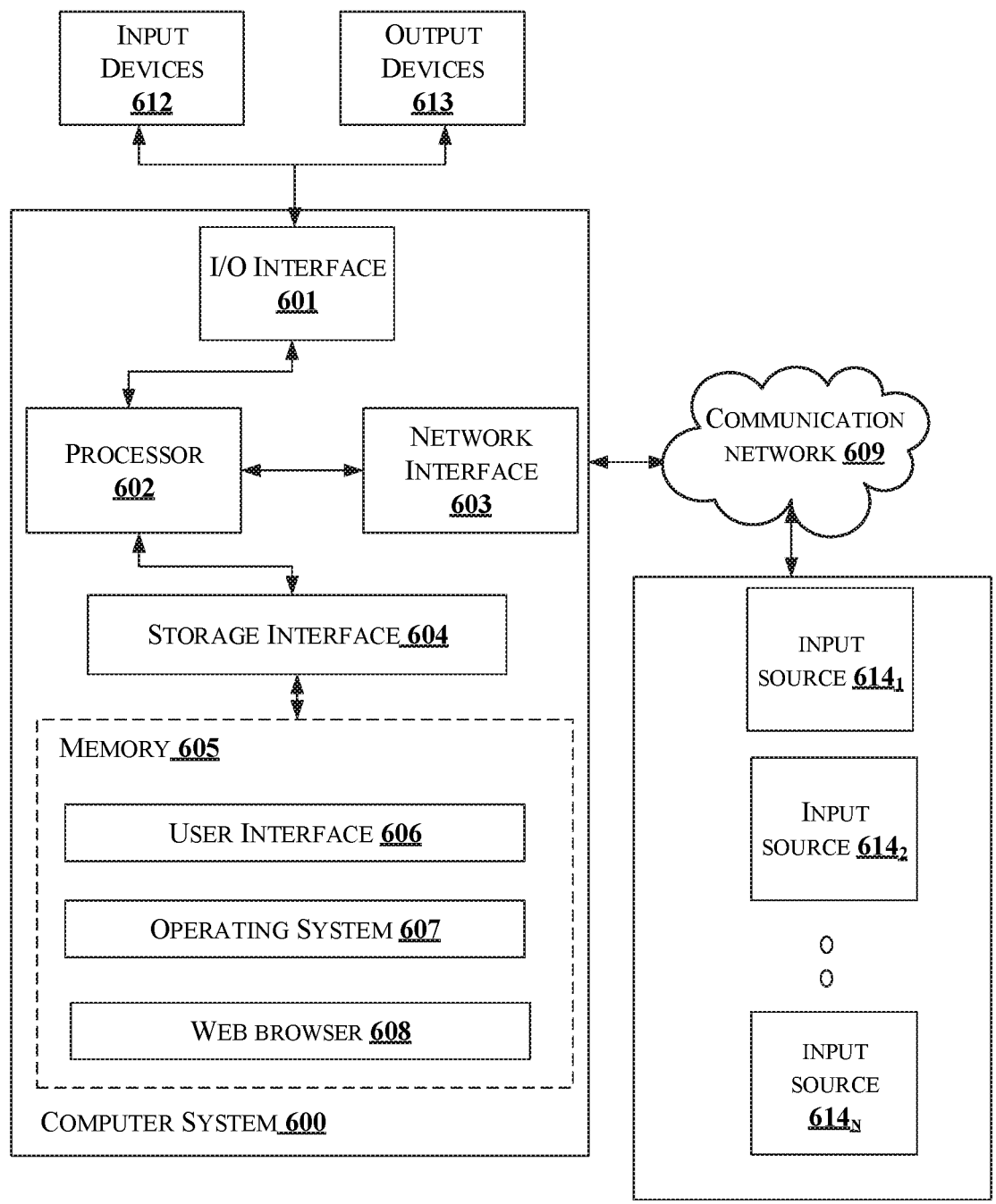
FIG. 6 illustrates a block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 may be used to implement the object determination system 101. The computer system 600 may include a central processing unit ("CPU" or "processor") 602. The processor 602 may include at least one data processor for determining one or more target objects in an image. The processor 602 may include specialized processing units such as, integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices. For example, input devices 612, such as an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. Output devices 613 such as, a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 600 consists of the object determination system 101. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. Using the network interface 603 and the communication network 609, the computer system 600 may communicate with an input source $614_1$, an input source $614_2$, and an input source $614_N$. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607 etc. In some embodiments, computer system 600 may store user/application data, such as, the data, variables, records, etc., as described in this disclosure. Such databases may be implemented as fault-tolerant, relational, scalable, secure databases such as Oracle or Sybase.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (B S D), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™ VISTA/7/8, 10 etc.), APPLE® IOS™, GOOGLE® ANDROID™, BLACK-BERRY® OS, or the like.

In some embodiments, the computer system 600 may implement a web browser 608 stored program component. The web browser 608 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBE® FLASH™, JAVASCRIPT™, JAVA™, Application Programming Interfaces (APIs), etc. In some embodiments, the computer system 600 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 600 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure determines signature, initials, notary and seal from documents.

An embodiment of the present disclosure provides a language agnostic system for determining one or more target objects by making use of morphological operation.

An embodiment of the present disclosure automatically identifies the target objects accurately.

An embodiment of the present disclosure handles variety of orientations, crowded/noisy/blurred images. FIG. 5 show an exemplary representation of a document with blurred regions, crowded regions and representation in different orientations for determining target objects in accordance with some embodiments of the present disclosure.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessors and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for target object identification, the method comprising:
    segmenting, by an object determination system, an image into segments based on a first set of one or more visual attributes of the image, and irrespective of a second set of one or more visual attributes corresponding to a target object, wherein at least one of the first set of one or more visual attributes is based on a structural format of contents of the image;
    performing, by the object determination system, one or more morphological operations on one or more of the segments to generate one or more morphed segments;
    identifying, by the object determination system, one or more candidates for the target object from the one or more morphed segments and based on the second set of one or more visual attributes corresponding to the target object;
    identifying, by the object determination system, from the one or more candidates a true positive candidate that is the target object based on an application of a trained machine learning model to neighborhood information associated with at least a portion of the contents of the image that is disposed within one of the one or more morphed segments that comprises the true positive candidate; and
    creating, by the object determination system, a placeholder for the target object based on a determined pixel location in the image, wherein the determined pixel location corresponds to the true positive candidate.

2. The method as claimed in claim 1, further comprising receiving, by the object determination system, a document and converting, by the object determination system, the document into the image before segmenting the image.

3. The method as claimed in claim 1, further comprising identifying, by the object determination system, at least one of one or more paragraphs, one or more logos, one or more tables, one or more footers, or one or more headers in the image using the first set to facilitate the segmentation of the image.

4. The method as claimed in claim 1, wherein the target object comprises at least one field for initials, signature, notary, or seal and the neighborhood information comprises at least one of text, one or more images, one or more margins, one or more tables, or one or more numbers adjacent to the true positive candidate.

5. The method as claimed in claim 1, wherein the one or more morphological operations comprise erosion, dilation, or redaction.

6. An object determination system for target object identification, the system comprising:
    a processor; and
    a memory communicatively coupled to the processor, wherein the memory stores instructions, which, on execution by the processor, cause the processor to:
        segment an image into segments based on a first set of one or more visual attributes of the image, and irrespective of a second set of one or more visual attributes corresponding to a target object, wherein at least one of the first set of one or more visual attributes is based on a structural format of contents of the image;
        perform one or more morphological operations on one or more of the segments to generate one or more morphed segments;
        identify one or more candidates for the target object from the one or more morphed segments and based on the second set of one or more visual attributes corresponding to the target object;
        identify from the one or more candidates a true positive candidate that is the target object based on an application of a trained machine learning model to neighborhood information associated with at least a portion of the contents of the image that is disposed within one of the one or more morphed segments that comprises the true positive candidate; and
        create a placeholder for the target object based on a determined pixel location in the image, wherein the determined pixel location corresponds to the true positive candidate.

7. The object determination system as claimed in claim 6, wherein the instructions, on execution by the processor, further cause the processor to execute the stored instructions to receive a document and convert the document into the image before segmenting the image.

8. The object determination system as claimed in claim 6, wherein the instructions, on execution by the processor, further cause the processor to identify at least one of one or more paragraphs, one or more logos, one or more tables, one or more footers, or one or more headers in the image using the first set to facilitate the segmentation of the image.

9. The object determination system as claimed in claim 6, wherein the target object comprises at least one field for initials, signature, notary, or seal and the neighborhood information comprises at least one of text, one or more images, one or more margins, one or more tables, or one or more numbers adjacent to the true positive candidate.

10. The object determination system as claimed in claim 6, wherein the one or more morphological operations comprise erosion, dilation, or redaction.

11. A non-transitory computer readable medium including instruction for target object identification stored thereon that when executed by at least one processor cause the at least one processor to:

- segment an image into segments based on a first set of one or more visual attributes of the image, and irrespective of a second set of one or more visual attributes corresponding to a target object, wherein at least one of the first set of one or more visual attributes is based on a structural format of contents of the image;
- perform one or more morphological operations on one or more of the segments to generate one or more morphed segments;
- identify one or more candidates for the target object from the one or more morphed segments and based on the second set of one or more visual attributes corresponding to the target object;
- identify from the one or more candidates a true positive candidate that is the target object based on an application of a trained machine learning model to neighborhood information associated with at least a portion of the contents of the image that is disposed within one of the one or more morphed segments that comprises the true positive candidate; and
- create a placeholder for the target object based on a determined pixel location in the image, wherein the determined pixel location corresponds to the true positive candidate.

12. The non-transitory computer readable medium as claimed in claim 11, wherein the instructions, when executed by the at least one processor, further cause the at least one processor to receive a document and convert the document into the image before segmenting the image.

13. The non-transitory computer readable medium as claimed in claim 11, wherein the instructions, when executed by the at least one processor, further cause the at least one processor to identify at least one of one or more paragraphs, one or more logos, one or more tables, one or more footers, or one or more headers in the image using the first set to facilitate the segmentation of the image.

14. The non-transitory computer readable medium as claimed in claim 11, wherein the target object comprises at least one field for initials, signature, notary, or seal and the neighborhood information comprises at least one of text, one or more images, one or more margins, one or more tables, or one or more numbers adjacent to the true positive candidate.

15. The non-transitory computer readable medium as claimed in claim 11, wherein the neighborhood information comprises at least one of text, one or more images, one or more margins, one or more tables, or one or more numbers.

* * * * *